(12) United States Patent
Gorte et al.

(10) Patent No.: US 6,811,904 B2
(45) Date of Patent: Nov. 2, 2004

(54) DIRECT OXIDATION METHOD FOR GENERATING ELECTRICITY

(75) Inventors: Raymond J. Gorte, Narberth, PA (US); John M. Vohs, Newtown Square, PA (US); Radu Craciun, Collierville, TN (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 318 days.

(21) Appl. No.: 09/934,797

(22) Filed: Aug. 22, 2001

(65) Prior Publication Data

US 2001/0053471 A1 Dec. 20, 2001

Related U.S. Application Data

(63) Continuation-in-part of application No. PCT/US00/05735, filed on Mar. 3, 2000, and a continuation-in-part of application No. 09/261,324, filed on Mar. 3, 1999, now Pat. No. 6,589,680.

(51) Int. Cl.⁷ .......................... H01M 8/00; H01M 8/10; H01M 4/86; H01M 4/90; H01M 4/96
(52) U.S. Cl. .............................. 429/13; 429/30; 429/40
(58) Field of Search .............................. 429/33, 13, 30, 429/34, 40; 427/453

(56) References Cited

U.S. PATENT DOCUMENTS

| 4,661,422 | A | | 4/1987 | Marianowski et al. |
| 5,306,411 | A | | 4/1994 | Mazanec et al. |
| 5,543,239 | A | | 8/1996 | Virkar et al. |
| 5,656,387 | A | | 8/1997 | Barnett et al. |
| 5,676,806 | A | | 10/1997 | Van Berkel et al. |
| 5,731,097 | A | | 3/1998 | Miyashita et al. |
| 6,214,485 | B1 | * | 4/2001 | Barnett et al. ................ 429/13 |

FOREIGN PATENT DOCUMENTS

| EP | 338 823 | 10/1989 |
| JP | 01 007475 | 1/1989 |
| WO | 00/13791 | 3/2000 |

OTHER PUBLICATIONS

Park et al. (Nature 404, 265–267, Mar. 2000).*
Murray et al. (Nature 400, 649–651, Aug. 1999).*
K. Eguchi et al.; *Electrical properties of certa–based oxides and their applications so solid oxide fuel cells*, Solid State ionics, 52, pp. 165–172, 1992.
M. Mogensten et al.; *Physical Properties of Mixed Conductor Solid Oxide Fuel Cell Anoden of Doped $CeO_2$ Electrochem, Soc.*, vol. 141, No. 8, pp. 2122–2128, Aug. 1994.
E.S. Putrai et al.; *Ceria–Based Anodes for the Direct Oxidation of Methane in Solid Oxide Fuel Cells*, Langemic, vol. 11, No. 12, pp. 4832–4837, 1995.
R.T. Baker et al.; *Eveluotion of peroskin amoder for the complete oxidation of dry methane in solid oxide fuel cells*, Solid State Jonics, 72, pp. 328–333, 1994.
K. Assano et al.; *A Novel Solid Oxide Fuel Cell System Using the Partial Oxidation of Methane*, L. Electrochem, Soc., vol. 142, No. 10, pp. 3241–3245, Oct. 1995.
Y. Hiei et al.; *Partial oxidation of methane for internally reformed solid oxide fuel cell*, Solid State Ionics, vol. 86–88, pp. 1267–1272, 1996.
N.M. Sammes et al.; *Synthesis and properties of dense nickel and cobalt straonia ceramics amode for solid oxide fuel cells*, J. Mat, Sci, 31, pp. 6069–6072, 1996.
C.H. Bartholonew: *Carbon Deposition in Stream Reforming and Methanation*, Catal. Rev.–Sci. Eng., 24(1), pp. 67–112, 1982.
T. Kawada et al: *Electrical properties of transition–metal–doped YSV*, Solid State Ionics, vol. 53–56, pp. 418–425, 1992.
T. Tsai et al.; *Effect of Mixed–Conducting Interfacial Layers on Solid Oxide Fuel Cell Anode Performance*, I. Electrochem. Soc., vol. 145, No. 5, pp. 1696–1701, May 1998.
H. Itoh et al.; *Configurational and Electrical Behavior of Mi–YSZ Cermet with Novel Microstrcutures for Solid Oxide Fuel Cell Amodes*, J. Electrochem. Soc. vol. 144, No. 2, pp. 641–646, Feb. 1997.
H. Boh et al.; *Improved Microstructure of Ni–YSZ Cermet Amode for SOFC with a Long Term Stability*, Denki Kagaku, vol. 64, No. 6, pp. 549–554, 1996.
H. Alqhtany et al.; *Methane Steam Reforming over Fa Electrodes to a Solid Electrolyte Cell*, Energy & Fuels, 7, pp. 495–504, 1993.

* cited by examiner

Primary Examiner—Patrick Ryan
Assistant Examiner—Julian Mercado
(74) Attorney, Agent, or Firm—Mark E. Fejer (57) ABSTRACT

A method for generating electricity in which a dry hydrocarbon and/or carbonaceous fluid fuel is introduced into the anode side of a solid oxide fuel cell having an anode electrode of porous YSZ and an electron—conducting metal having an oxide form which melts at a temperature less than about 1550° C. An oxidant is introduced into the cathode side of the cell and is electrochemically reacted with the dry fluid fuel resulting in substantially complete oxidation of the fluid fuel and generation of electricity.

16 Claims, 12 Drawing Sheets

□, Pmax = 5.1 mW/cm²
○, Pmax = 104.9 mW/cm²
△, Pmax = 151.2 mW/cm²

DIRECT OXIDATION METHOD FOR GENERATING ELECTRICITY

This application is a continuation-in-part application of co-pending U.S. patent application Ser. No. 09/261,324 filed 03 Mar. 1999, now U.S. Pat. No. 6,589,680 B1, and PCT International Patent Application No. PCT/US00/05735 filed 03 Mar. 2000.

BACKGROUND OF THE INVENTION

1. Field of the Invention

This invention relates to a method for direct oxidation of a hydrocarbon and/or carbonaceous fluid fuel. More particularly, this invention relates to a method for generating electricity by directly oxidizing a hydrocarbon fluid fuel and/or a carbonaceous fluid fuel. This invention also relates to the use of electrochemical reactors including, but not limited to, solid oxide fuel cells (SOFC) for the direct oxidation of hydrocarbon and/or carbonaceous fluid fuels for generating electricity.

2. Description of Prior Art

Solid oxide fuel cells have grown in recognition as a viable high temperature fuel cell technology. There is no liquid electrolyte with its attending metal corrosion and electrolyte management problems. Rather, the electrolyte of the cells is made primarily from solid ceramic materials so as to survive the high temperature environment. The operating temperature of greater than about 600° C. allows internal reforming, promotes rapid kinetics with non-precious materials, and produces high quality by-product heat for cogeneration or for use in a bottoming cycle. The high temperature of the solid oxide fuel cell, however, places stringent requirements on its materials. Because of the high operating temperatures of conventional solid oxide fuel cells (approximately 1000° C.), the materials used in the cell components are limited by chemical stability in oxidizing and reducing environments, chemical stability of contacting materials, conductivity, and thermomechanical compatibility.

A solid oxide fuel cell generates electricity through the reduction of $O_2$ to $O^{2-}$ anions at the cathode, transfer of the anions through an electrolyte that is an electronic insulator (usually yttria-stabilized zirconia, YSZ), and finally the reduction of the $O^{2-}$ anions by the fuel at the anode. Effectively, the chemical energy produced when the fuel is oxidized is given up to the electrons produced at the anode. Because the anode must be an electronic conductor and have a good thermal-expansion match with the electrolyte, it is usually composed of a ceramic-metal (cermet) composite, in which YSZ is the ceramic component. The most common anode materials for solid oxide fuel cells are nickel (Ni)-cermets prepared by high-temperature calcination of NiO and yttria-stabilized zirconia (YSZ) powders. High-temperature calcination is essential in order to obtain the necessary ionic conductivity in the YSZ. These Ni-cermets perform well for hydrogen ($H_2$) fuels and allow internal steam reforming of hydrocarbons if there is sufficient water in the feed to the anode. Because Ni catalyzes the formation of graphite fibers in dry methane, it is necessary to operate anodes at steam/methane ratios greater than 3. However, there are significant advantages to be gained by operating under dry conditions. Progress in this area has been made using an entirely different type of anode, either based on ceria (See Eguchi, K, et al., *Solid State Ionics*, 52, 165 (1992); Mogensen, G., *Journal of the Electrochemical Society*, 141,2122 (1994); and Putna, E. S., et al., *Langmuir*, 11 4832 (1995) or perovskite anodes (See Baker, R. T., et al., *Solid State Ionics*, 72, 328 (1994); Asano, K., et al., *Journal of the Electrochemical Society*, 142, 3241 (1995); and Hiei, Y., et al., *Solid State Ionics*, 86–88, 1267 (1996).). These oxides do not, however, provide sufficient electronic conductivity. Replacement of Ni with other metals, including Co (See Sammes, N. M., et al., *Journal of Materials Science*, 31, 6060 (1996)), Fe (See Horite, T. et al., *Journal of the Electrochemical Society*, 143, 1161 (1996)) or Ag (Tsiplakides, D. et al., *Journal of Catalysis*, 185, 237 (1999)) has been considered; however, with the possible exception of Ag, these are likely to react with hydrocarbons in a way similar to that of Ni. Substitution of Ni with Cu would also be promising but for the fact that CuO melts at the calcination temperatures which are necessary for establishing the YSZ matrix in the anodes.

It is also well known that the addition of ceria to the anode improves performance. However, the high-temperature calcination utilized in conventional anode preparation causes ceria to react with YSZ, as a result of which performance is not enhanced to the extent that could be possible if formation of ceria-zirconia did not occur.

Fuel cells are attractive for power generation because much higher efficiencies can be achieved than in combustion engines. At present, most fuel cells require the use of $H_2$ as the fuel, which is a severe limitation for their practical implementation as battery replacements and for transportation. However, the generation of electrical energy by the direct oxidation of hydrocarbons and carbonaceous materials in a fuel cell, without first reforming these fuels to $H_2$, is a goal that many have viewed as unachievable.

SUMMARY OF THE INVENTION

Accordingly, it is one object of this invention to provide a method for generation of electricity by direct oxidation of hydrocarbons and other carbonaceous fuels.

It is another object of this invention to provide a solid oxide fuel cell for generating electricity using dry hydrocarbon and/or carbonaceous fluid fuels.

These and other objects of this invention are addressed by a method for generating electricity using a solid oxide fuel cell comprising an anode electrode, a cathode electrode and an electrolyte disposed between the anode electrode and the cathode electrode in which the anode electrode is contacted with at least one of a dry hydrocarbon fluid fuel ($C_xH_y$) and a dry carbonaceous fluid fuel ($C_xH_yO_z$) the cathode is contacted with an oxidant, and the dry hydrocarbon fluid fuel and/or dry carbonaceous fluid fuel is directly oxidized by means of an electrochemical reaction, resulting in the generation of electricity. Suitable fluid fuels include, but are not limited to, methane, ethane, ethanol, propane, propanol and butane. By the term "dry" as used in connection with the hydrocarbon and carbonaceous fluid fuels utilized in the method of this invention, we mean fuels in which substantially no water in any form is present when undergoing oxidation in the fuel cell. To effect the direct oxidation of the hydrocarbon and/or carbonaceous fluid fuel, the anode electrode is constructed of a porous YSZ layer and a metal or metal alloy comprising an electron-conducting metal having an oxide form which melts at a temperature less than about 1550° C. In accordance with one preferred embodiment, the electron-conducting metal is selected from the group consisting of Cu, Ni and alloys and mixtures thereof.

Anode electrodes for solid oxide fuel cells utilized in the method of this invention may be produced by a method in which a plurality of zircon fibers or other porous matrix material is mixed with a yttria-stabilized-zirconia (YSZ) powder, thereby forming a fiber/powder mixture. The fiber/powder mixture is then formed into a porous YSZ layer and calcined. Alternatively, a porous YSZ layer may be prepared by the tapecasting of YSZ with graphite pore formers. (See Corbin, S. F., *Journal of American Ceramics Society*, 82, 1693 (2000). The calcined porous YSZ layer is then impregnated with a metal-containing salt solution. As used herein, the term "impregnated" refers to a condition in which the metal-containing salt solution is disposed within the pores of the calcined porous YSZ layer. Contrary to conventional methods for solid oxide fuel cell anode electrode preparation, this method results in a YSZ layer which remains highly porous following high-temperature calcination to which any suitable metal, including Cu and Ni is then added by impregnation of the salt solution, after the high temperature calcination of the YSZ layer. In addition to enabling the use of metals whose oxides have a low melting temperature, this method of anode electrode production also allows catalytic materials, such as ceria and/or palladium (Pd) to be added in controlled amounts in a separate step.

BRIEF DESCRIPTION OF THE DRAWINGS

These and other objects and features of this invention will be better understood from the following detailed description taken in conjunction with the drawings wherein.

DESCRIPTION OF PRESENTLY PREFERRED EMBODIMENTS

As used herein, "generating electricity" refers to an electrochemical process in which the oxidation products are substantially only $H_2O$ and $CO_2$.

As used herein, the term "direct oxidation" refers to a process in which a hydrocarbon and/or carbonaceous material is introduced directly into the fuel cell, that is, without having first been converted to $H_2$, in which it is oxidized.

As previously stated, conventional solid oxide fuel cells are unable to operate efficiently in dry fuels such as natural gas, the primary component of which is methane. This is due to the fact that they typically employ Ni-cermet anodes which are prepared by high-temperature calcination of powders consisting of NiO and yttria-stabilized zirconia. High-temperature calcination is essential in order to obtain the necessary ionic conductivity in the YSZ. Under the reducing conditions of operation, NiO is reduced to the metal and provides electronic conductivity. However, in dry natural gas, Ni tends to form graphite fibers which quickly deactivate the system. Ni can be replaced by Fe or Co, but these metals suffer from similar problems. We have developed a method for preparation of an anode for a solid oxide fuel cell which allows the addition of the electron-conducting metal, including metals like Cu, for which the oxide melts at low temperature, in a manner which does not require the high-temperature calcination of conventional methods. As a result, we are able to operate a solid oxide fuel cell having such an anode and using dry natural gas, or other dry hydrocarbon and carbonaceous materials, as a fuel without the formation of graphite fibers or carbon for extended periods of time and without significant degradation in fuel cell performance. In addition, catalytic and ion-transfer components, such as ceria, lanthana, praeseodymia, manganese, and precious metals can also be added without further, high-temperature treatment.

In accordance with this method, a porous YSZ matrix material is prepared (for example, by using a plurality of zircon fibers with YSZ powder, followed by calcination, or by preparing a tape cast with pore forming materials). The porous YSZ layer is impregnated with a metal-containing salt solution. In accordance with one preferred embodiment, the metal-containing salt solution comprises a nitrate salt of a metal selected from the group consisting of Cu, Ni and mixtures thereof.

In accordance with one embodiment of this invention, the fiber/powder mixture is made into a slurry with glycerol and then applied to the anode side of the dense YSZ electrolyte of a solid oxide fuel cell. Alternatively, a YSZ tapecast with pore forming materials can be cast over a second YSZ tape without pore formers, resulting in a porous matrix attached to a dense YSZ layer. The system is then calcined at a suitable temperature, for example 1550° C., for two hours. After addition of the cathode to the cathode side of the YSZ electrolyte, the porous YSZ layer on the anode side is impregnated with aqueous solutions of $Ni(NO_3)_2$ and/or $Cu(NO_3)_2$ to bring the metal content of the anode to at least 10% by weight metal, after which the anode is calcined at 950° C. for two hours. If zircon fibers are used to introduce porosity, it is very important either to mix a normal YSZ powder (about 20% by weight) with the zircon fibers in the original glycerol slurry, or to add ceria or YSZ to the porous YSZ layer so as to provide sufficient oxide in the anode for ionic conductivity. Ceria may be added using an aqueous solution of $Ce(NO_3)_3$ to the porous anode, after addition of the metal. After drying, the anode is again calcined to 900°

C. to form the oxide or ceria. Preferably, ceria constitutes in the range of about 5% to about 40% by weight of the porous YSZ layer.

EXAMPLE

Yttria-stabilized zirconia (8% $Y_2O_3$, Tosoh TZ-8Y, denoted as YSZd) was used for the fabrication of the electrolyte and conventionally prepared anode for a solid oxide fuel cell. The electrolyte wafers were formed from YSZd by tapecasting, followed by calcination to 1400° C. for two hours. The cathodes were formed from a 50% by weight physical mixture of Sr—$LaMnO_3$ and YSZd powders, pasted onto the electrolyte with glycerol, and then calcined at 1250° C. for two hours. The conventional, Ni-cermet anode was prepared using a 50% by weight physical mixture of NiO and YSZd, followed by calcination to 900° C. This Ni-cermet was pasted onto the electrolyte using glycerol and calcined to 1400° C.

For preparation of an anode for a solid oxide fuel cell suitable for use in the direct oxidation of dry hydrocarbon and dry carbonaceous fluid fuels, a porous YSZ layer was prepared from physical mixtures of zircon fibers (YSZ, 75% porosity, with less than about 0.3% Si, Zircar Products, Inc., denoted as YSZp) and YSZd. The physical mixture (denoted as YSZm) was pasted onto the electrolyte using glycerol and calcined to 1550° C. for two hours. After addition of the cathode, the porous YSZ layer was impregnated with aqueous solutions of $Cu(NO_3)_2$ (Fisher Scientific) or $Ni(NO_3)_2$ (Aldrich) followed by calcination at 950° C. for two hours, at a Cu (or Ni) content of 40% by weight.

A sample doped with ceria was prepared by adding ceria in an amount of about 5 to about 40 weight percent of the anode material, to the anode by impregnation using $Ce(NO_3)_3 6H_2O$ (Aldrich) followed by calcination to 950° C. The fraction of YSZd used in the anode and the metal content of the anode were varied.

Pt electrodes were attached to both anodes and cathodes using a Pt ink (Engelhard, A4338), followed by calcination at 950° C. for thirty minutes. The cells were sealed into $Al_2O_3$ tubes using quartz powder in polyvinyl solutions. They were then conditioned in $H_2$ for three to four hours at 950° C. The performance of the cells was measured using flowing $H_2$ at 1 atmosphere at the anode, and the cathode was open to air.

SEM images were obtained using a JEOL 6300 microscope equipped with an X-ray analyzer for EDX analysis. Samples were deposited onto carbon tape and coated with a gold film before analysis. X-ray powder diffraction patterns were obtained with a Rigaku XRD diffractometer, using Cu K$\alpha$ radiation($\lambda$=1.541838 Å). The mean crystallite size ($\bar{d}$) of YSZ particles was determined from XRD line-broadening measurements using the Scherrer equation.

Figure 1:
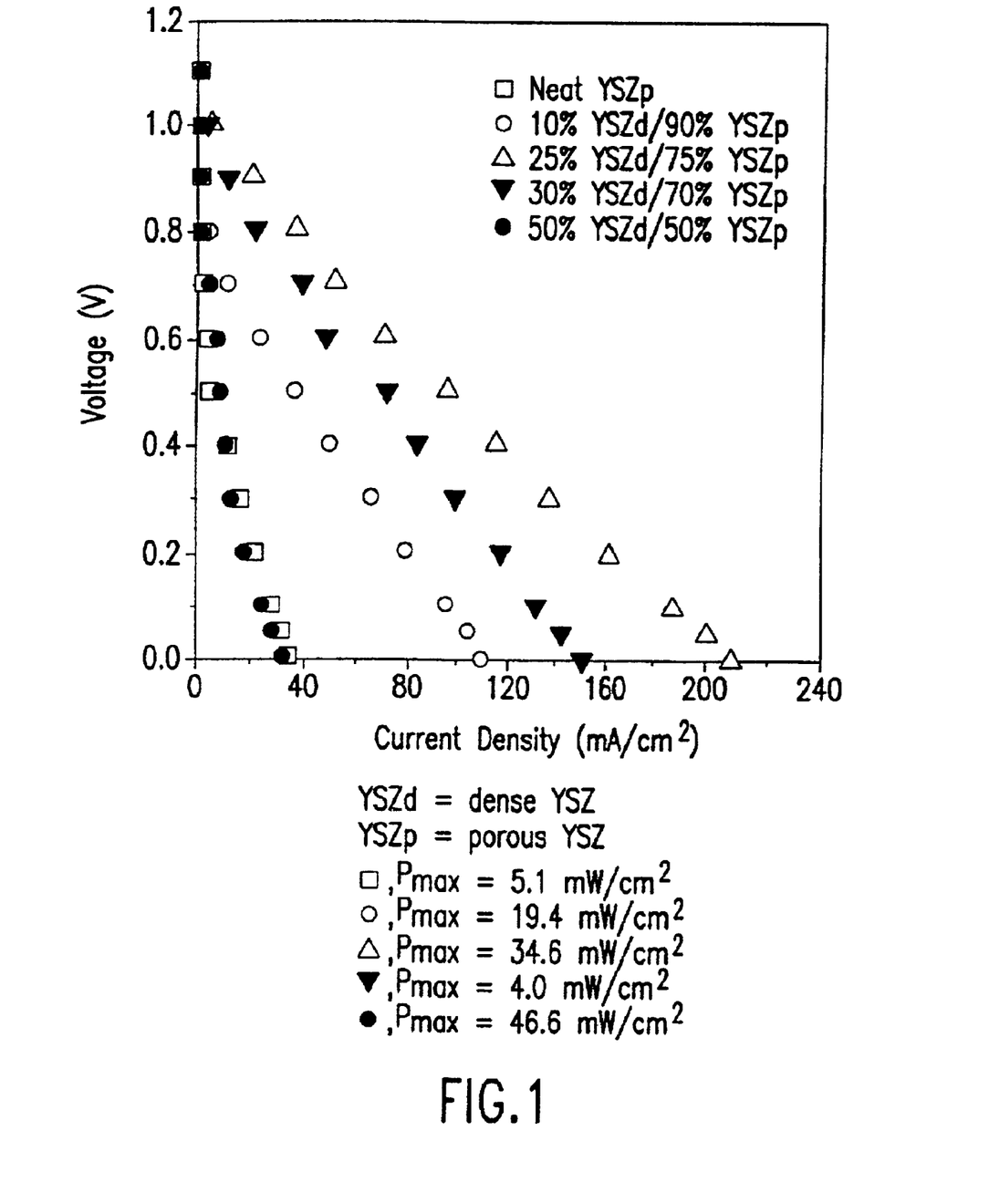
FIG. 1 is a diagram showing the I-V relationship for cells at 800° C. in $H_2$ prepared by impregnating porous YSZ with 40% Cu in accordance with one embodiment of the method of this invention.

FIG. 1 shows the performance for series of cells with Cu-cermet anodes prepared in accordance with the method of this invention at 800° C. In this series, the Cu content was maintained at approximately 40% by weight, but the fraction of non-porous YSZd was varied. Performance for the pure zircon fibers (neat YSZp) was poor, giving a maximum power density of only 5.1 mW/cm$^2$ and a maximum current density of 35 mA/cm$^2$. Adding YSZd to the layer improved the performance significantly, with the best performance being achieved at about 25% by weight YSZd. The maximum power density for this cell was nearly 50 mW/cm$^2$, with a maximum current density of 210 mA/cm$^2$. Increasing the fraction of YSZd in the layer led to poorer performance. The results in FIG. 1 demonstrate the importance of maintaining the proper structure of the YSZ in the anode as well as the possibility of a deleterious effect of Si in the zircon fibers.

Figure 2A:
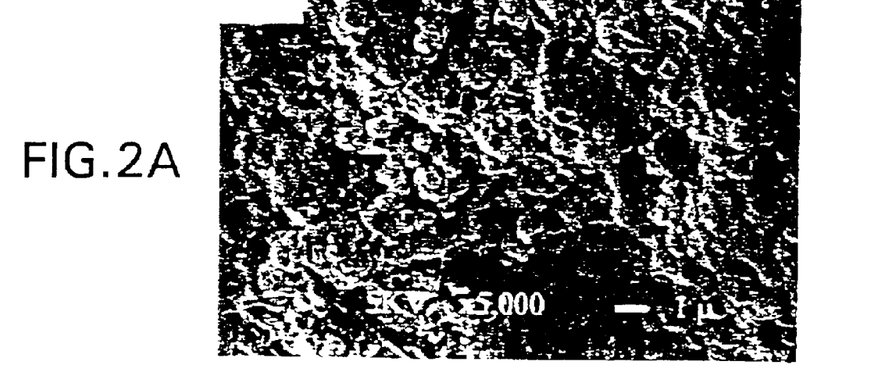
FIGS. 2A, 2B, and 2C show SEM micrographs for conventional Ni-cermet prepared from NiO and dense yttria-stabilized zirconia, designated as YSZd, neat porous yttria-stabilized zirconia designated as YSZp, and Cu-cermet prepared from 25% YSZd impregnated with 40% Cu, respectively.
Figure 2B:
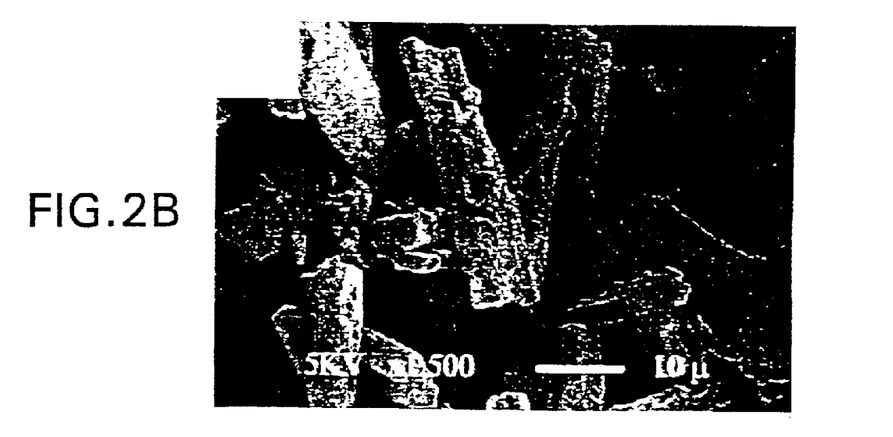
Figure 2C:
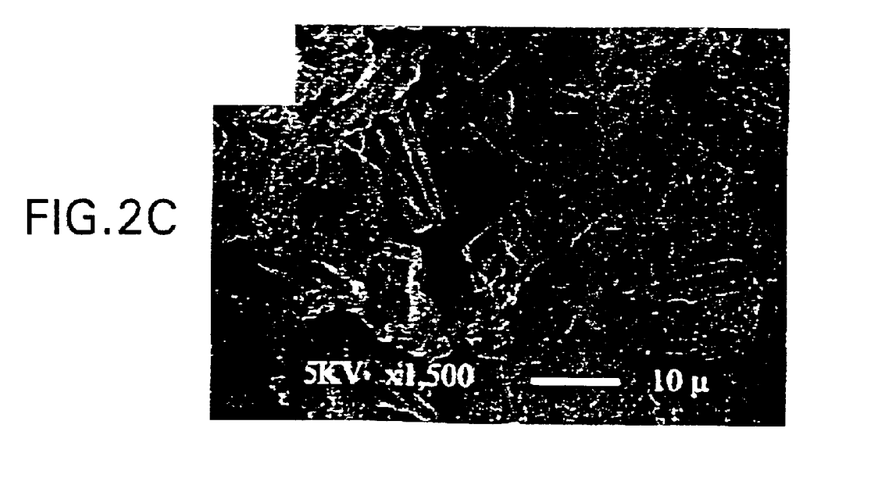

FIGS. 2A, 2B, and 2C show SEM pictures of several representative samples of anodes taken for the purpose of investigating their morphologies. FIG. 2A is a micrograph of the conventional Ni-cermet taken at a magnification of 5000×. Shown is a dense film made up of about 1-micron particles. Before exposure to $H_2$ (the fuel atmosphere), EDX analysis and XRD patterns show the presence of NiO particles as a physical mixture with the YSZ ($\bar{d}$=28.5 nm). After exposure to $H_2$ at 950°–800° C. (reducing atmosphere), NiO is reduced to Ni metal ($\bar{d}$=26 nm), determining a small porosity (about 20%) to the compact NiO-YSZ material. The micrographs of the neat zircon fibers, shown in FIG. 2B at 1500× after heating to 1550° C., show rods, roughly 20 microns long and 5 microns in diameter. The film remains highly porous, about 70% void, but contact between the rods appears to be poorer. Finally, the film formed by adding 25% by weight YSZd and Cu in accordance with the method of this invention is shown in FIG. 2C. The structure remains open due to the rod-like fibers. Even with the addition of non-porous YSZd and significant amounts of Cu, the film remains highly porous. Before $H_2$ exposure, small crystallites of CuO ($\bar{d}$=12.3 nm) were formed on the YSZm material. After $H_2$ exposure at 950° C., Cu metal particles ($\bar{d}$=34 nm) are formed, as was observed in the Ni-cermet case.

Figure 3:
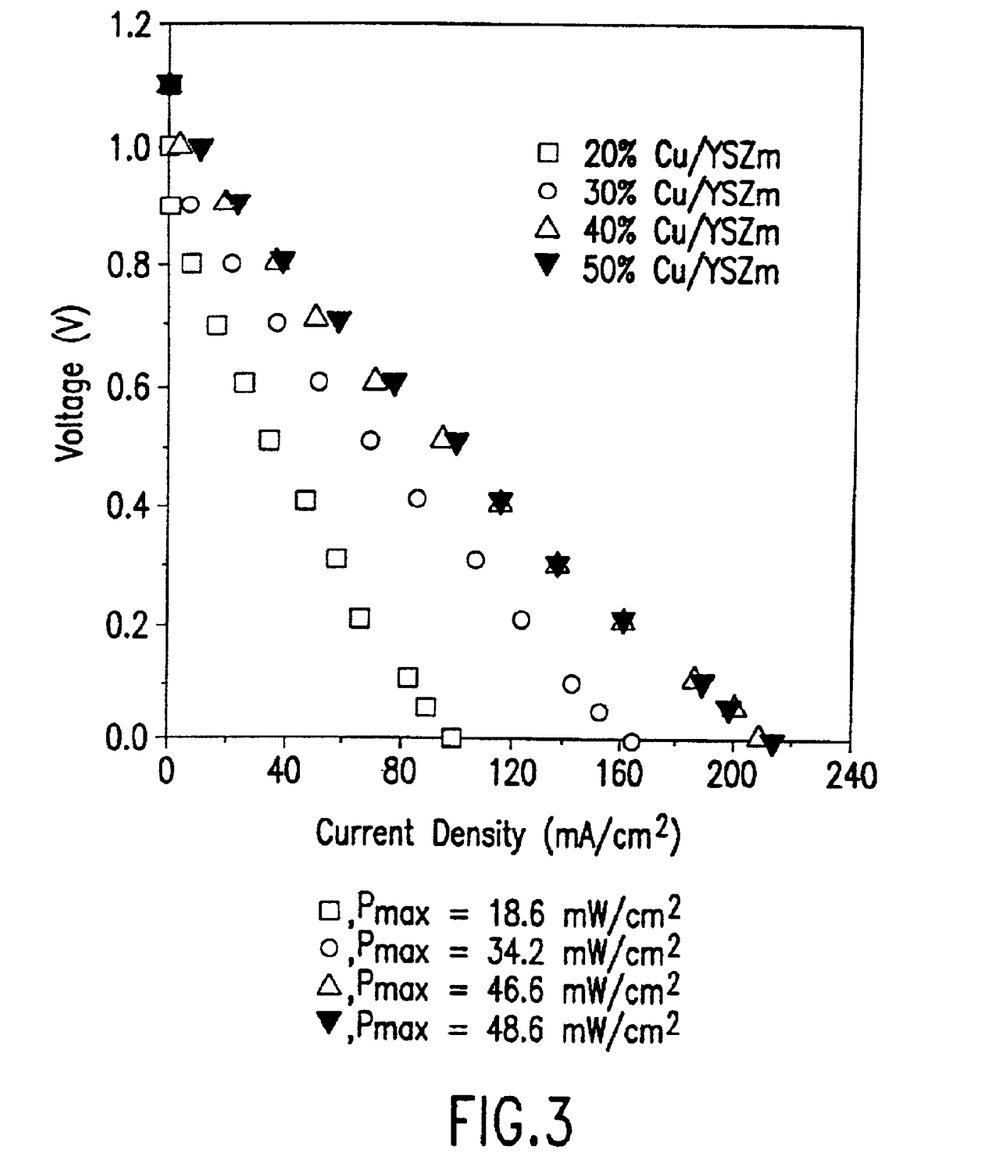
FIG. 3 is a diagram showing the I-V relationship for cells at 800° C. in $H_2$ prepared by impregnating porous YSZ (25% YSZd) with varying amounts of Cu.

The effect of changing the Cu content in the anode for the YSZm made from 25% by weight YSZd is shown in FIG. 3. As can be seen, there is a definite improvement in cell performance observed with increases in Cu from about 20% to about 50% by weight Cu, for this particular porous matrix.

Figure 4:
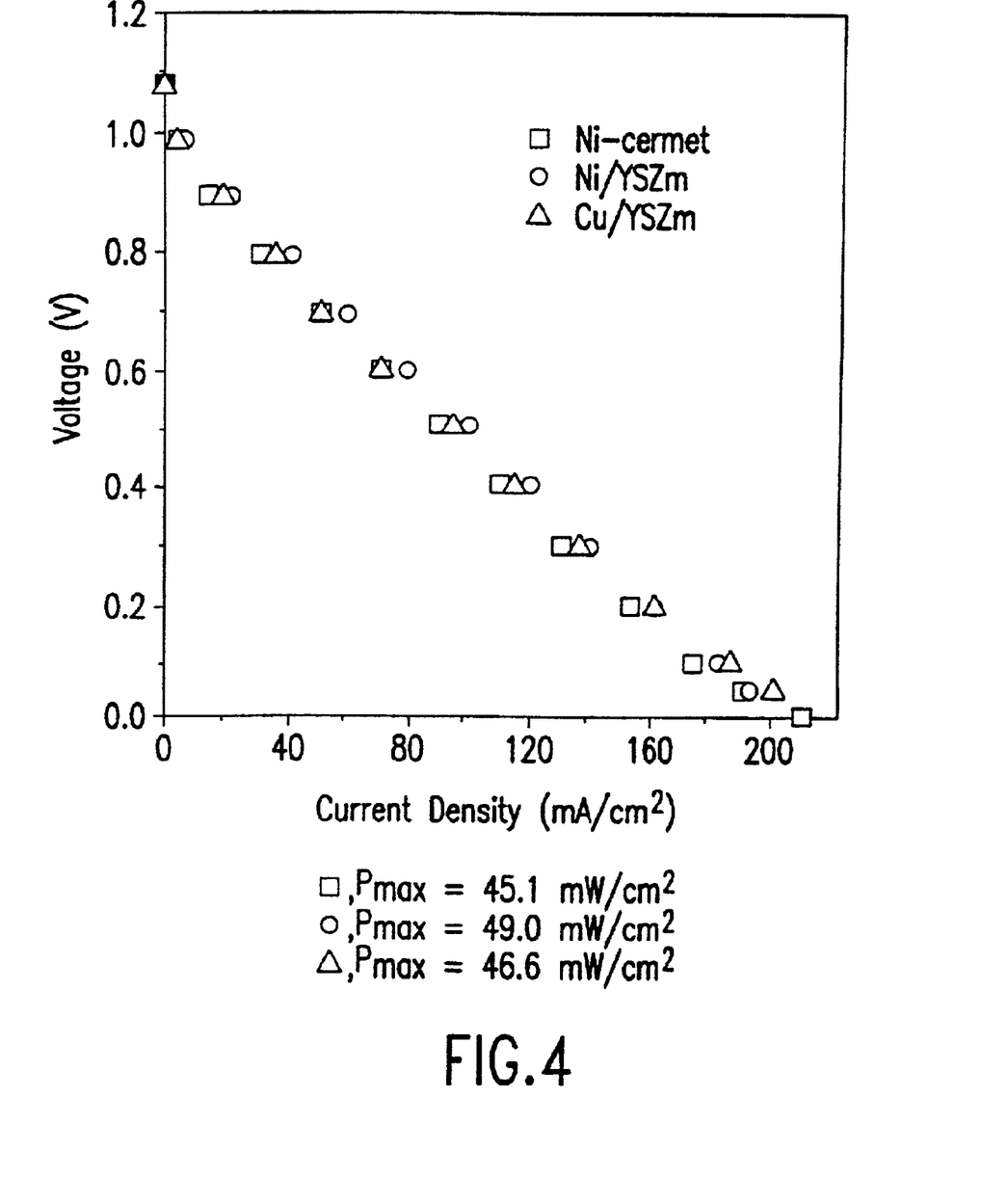
FIG. 4 is a diagram showing the I-V relationship for cells at 800° C. in $H_2$ with a conventional Ni-cermet anode, a Ni-cermet anode prepared from porous YSZ (25% YSZd), and Cu-cermet prepared from porous YSZ (25% YSZd)

FIG. 4 shows a comparison of results for a Ni-cermet anode prepared by conventional methods, a Ni-cermet with 40% Ni prepared from YSZm in accordance with one embodiment of this invention and a Cu-cermet with 40% by weight Cu prepared from YSZm in accordance with one embodiment of this invention. The results for all three cells are virtually identical, with maximum power densities between 45 and 50 mW/cm$^2$. The similarity in performance suggests that the performance of these three cells is limited by the electrolyte and cathodes and not the anodes. In addition, because the catalytic properties of Ni and Cu are very different, with $H_2$ dissociation occurring much more readily on Ni, this suggests that the catalytic properties of the metals are not crucial in this application with $H_2$ fuels. Rather Ni and Cu are primarily electronic conductors in this case.

Figure 5:
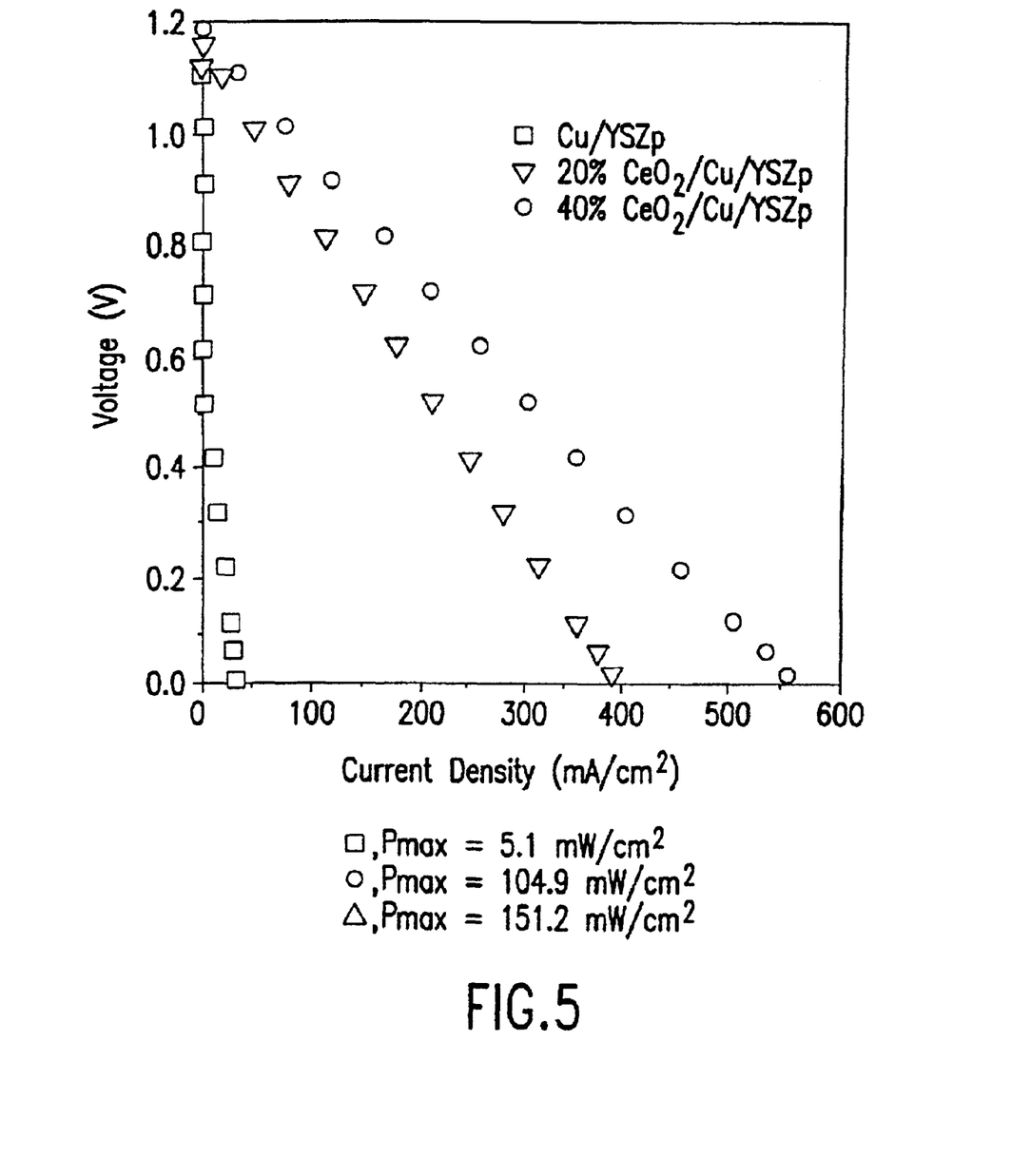
FIG. 5 is a diagram showing the I-V relationship for cells at 800° C. in $H_2$ with the addition of ceria to a Cu/YSZp mixture.
Figure 6:
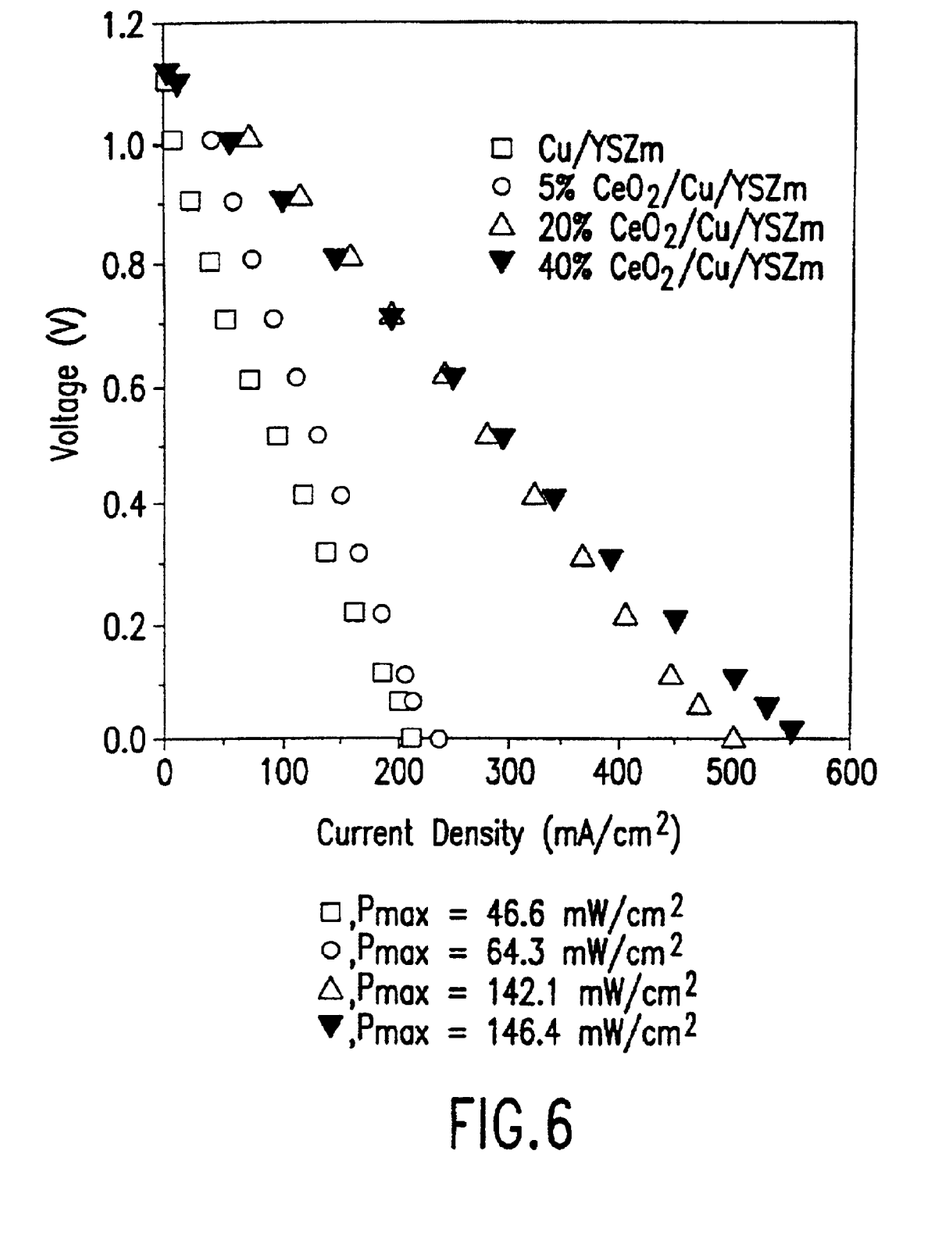
FIG. 6 is a diagram showing the I-V relationship for cells at 800° C. in $H_2$ with the addition of ceria to a Cu/YSZ mixture.

FIGS. 5 and 6 show the typical doping effect of ceria on Cu/YSZp and Cu/YSZm prepared using the method of this invention. The data for these cells shows that the power densities increased significantly with the addition of ceria. For 40% by weight ceria addition to Cu/YSZp and Cu/YSZm, the best results achieved were 151.2 mW/cm$^2$ and 146.4 mW/cm$^2$, which compared to 5.1 mW/cm$^2$ and 46.6 mW/cm$^2$ obtained in the same cells without ceria. The measured current density on $CeO_2$/Cu/YSZp was much higher than neat Cu/YSZp according to ceria contents. However, the current density does not increase over 20% by weight ceria on Cu/YSZm. In such ceria content range, there is a limit to the improvement of cell performance obtained.

Figure 7:
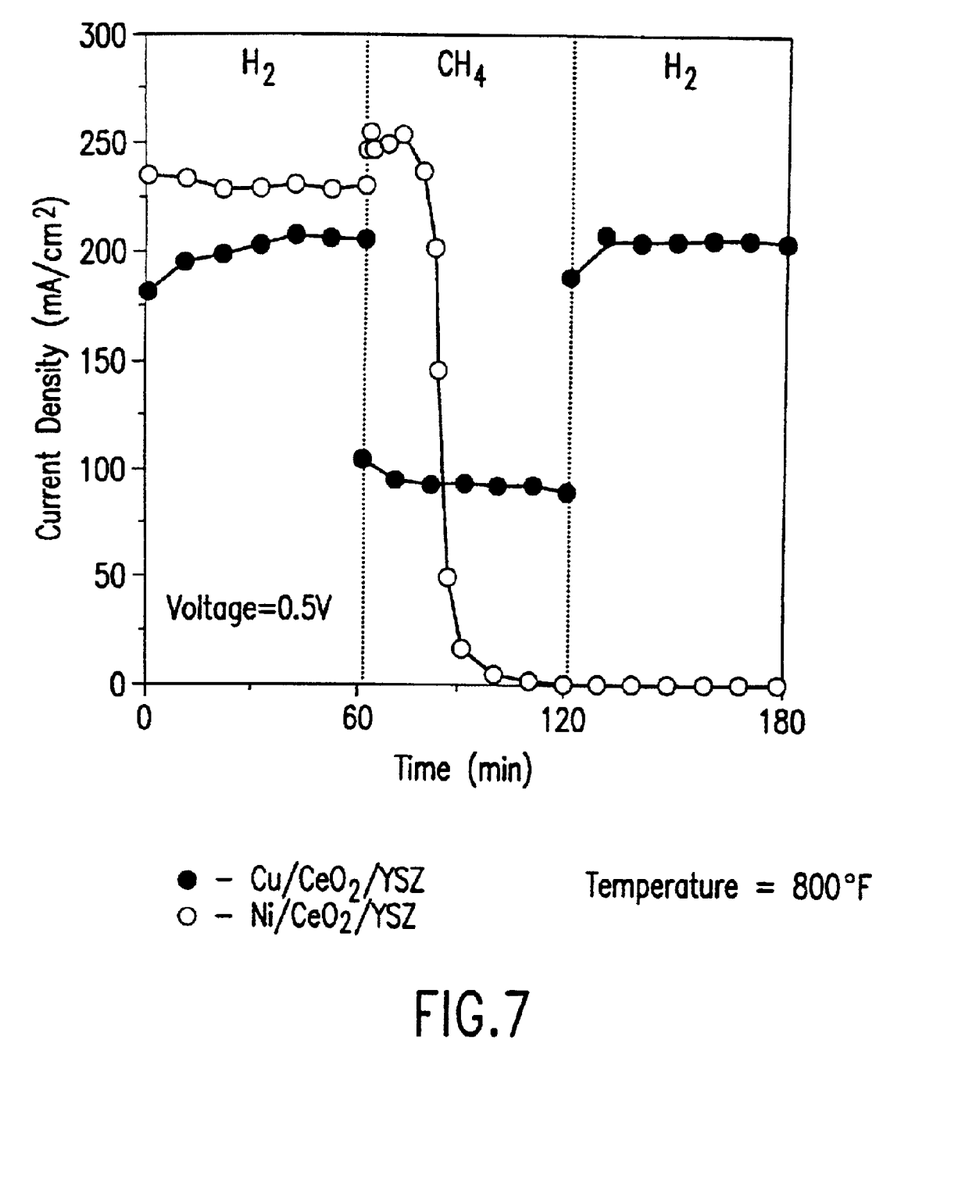
FIG. 7 is a diagram showing current density as a function of time for Ni- and Cu-based cells during switching of fuels from dry $H_2$ to dry $CH_4$ and back
Figure 8:
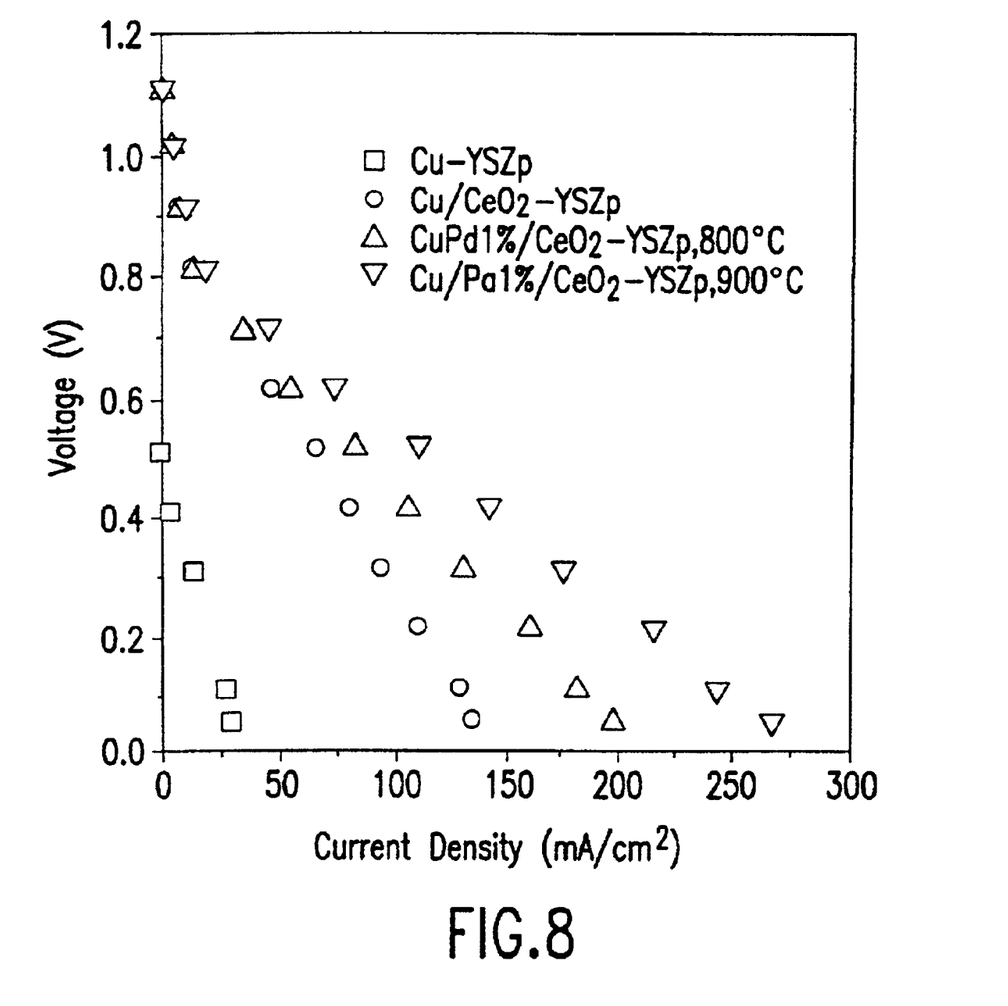
FIG. 8 is a diagram showing the I-V relationship for Cu-based cells with methane.

The effect of adding ceria and Pd, using dry methane as a fuel is shown in FIGS. 7 and 8. Before discussing the I-V curves, it is important to address the stability issues. As expected, the Ni-YSZ anode prepared in accordance with the method of this invention deactivated rapidly. While we did observe currents at 800° C., they decreased rapidly over the period of a few minutes with the formation of a carbonaceous residue. This is shown in FIG. 7, which shows the current density for a Ni/CeO$_2$/YSZ (open circles) at a cell voltage of 0.5 volts with switching of fuels from dry H$_2$ to dry CH$_4$ and back. The cell with a Ni/CeO$_2$/YSZ anode deactivated rapidly. Visual inspection showed the presence of large amounts of carbon. By contrast, the Cu/CeO$_2$/YSZ cells were entirely stable. Following exposure to dry methane for up to three days, we observed no evidence of decreased performance or carbon formation.

The performance of the Cu-based cells with dry methane is shown in FIG. 8. For the Cu-YSZ anode, the open-circuit voltage (OCV) was only about 0.5 volts and the power density was minimal. Addition of ceria led to a dramatic improvement, as did the addition of Pd. However, the maximum power density with methane is still much lower than with hydrogen, about 80 mW/cm$^2$ compared to 165 mW/cm$^2$. This difference between methane and hydrogen is lowered by working at higher temperatures. At 900° C., the maximum power density achieved with this cell was about 230 mW/cm$^2$ with H$_2$ and 160 mW/cm$^2$ with CH$_4$. This suggests that the catalytic reaction is at least partly limiting the reaction with methane, but that reasonable performance can be achieved with dry methane if a catalytic component is added.

Figure 9:
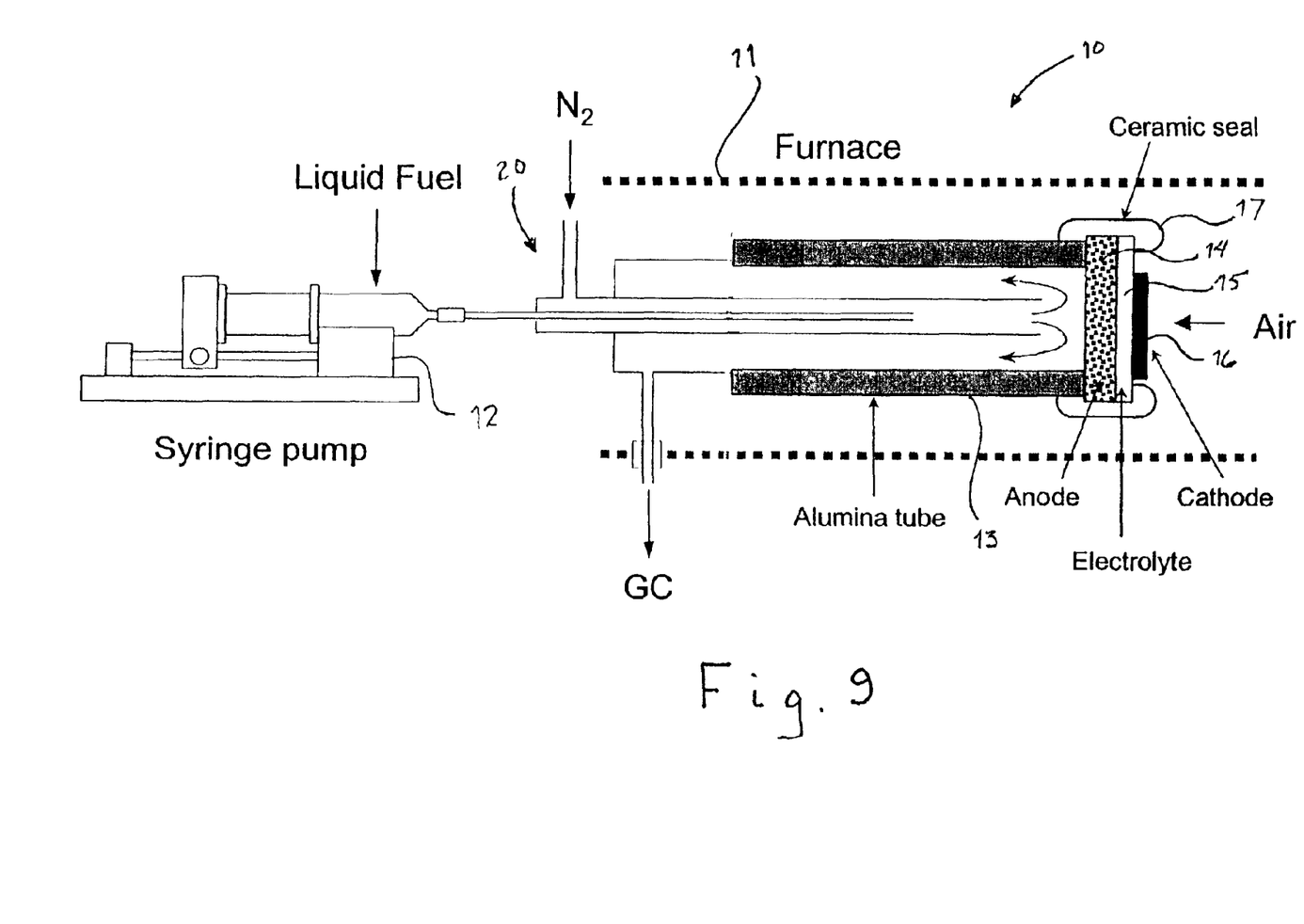
FIG. 9 is a diagram of an apparatus used in testing the method of this invention.

The experimental apparatus used for demonstrating the method of this invention for fuels that are liquids at room temperature is shown schematically in FIG. 9. The apparatus 10 comprises a furnace 11 in which is disposed an alumina tube 13 closed off at one end by an electrochemical cell comprising an anode electrode 14, a cathode electrode 16 and an electrolyte 15 disposed therebetween. The opposite end of alumina tube 13 is closed off by a manifold 20 through which nitrogen and a liquid fuel are introduced into the interior of alumina tube 13. The liquid fuel is introduced into the alumina tube 13 by means of syringe pump 12 where it comes into contact with anode electrode 14. The model fuel cells were prepared using a dual tape-casting method in which a green tape with pore formers is cast over a green tape without pore formers. Calcination to 1800° K resulted in a YSZ wafer with a dense layer that was 60 μm thick and a porous layer 400 μm thick. Hg porosimetry showed the porosity was 52% on the porous side. A 50:50 mixture of YSZ and La$_{0.8}$Sr$_{0.2}$MnO$_3$ (LSM, Praxair Surface Technologies) powders was pasted onto the dense side of the wafer, then calcined to 1400° K to form the cathode. Cu and ceria were then added in separate steps using wet impregnation of aqueous, nitrate solutions to a final concentration of 10 wt % ceria and 20 wt % Cu, followed by heating in air at 750° K to form the oxides. Electronic contacts were formed using a Pt mesh and Pt paste at the cathode and Au mesh and Au paste at the anode. Finally, the cell, having an active anode surface of 0.25 cm$^2$, was sealed onto 1.0-cm alumina tubes using a zirconia-based adhesive (Aremco).

Liquid fuels were introduced directly into the anode compartment using the syringe pump and dry N$_2$ was added in most experiments to maintain flow. The liquid flow rate for the hydrocarbon fuels was maintained at 1.0 μl/sec, a flow rate which ensured that the conversion of the fuel was always below 1%, even at the highest current densities. The cathode was left open to air. An on-line gas chromatograph was used to monitor the composition of the effluent from the anode.

Figure 10:
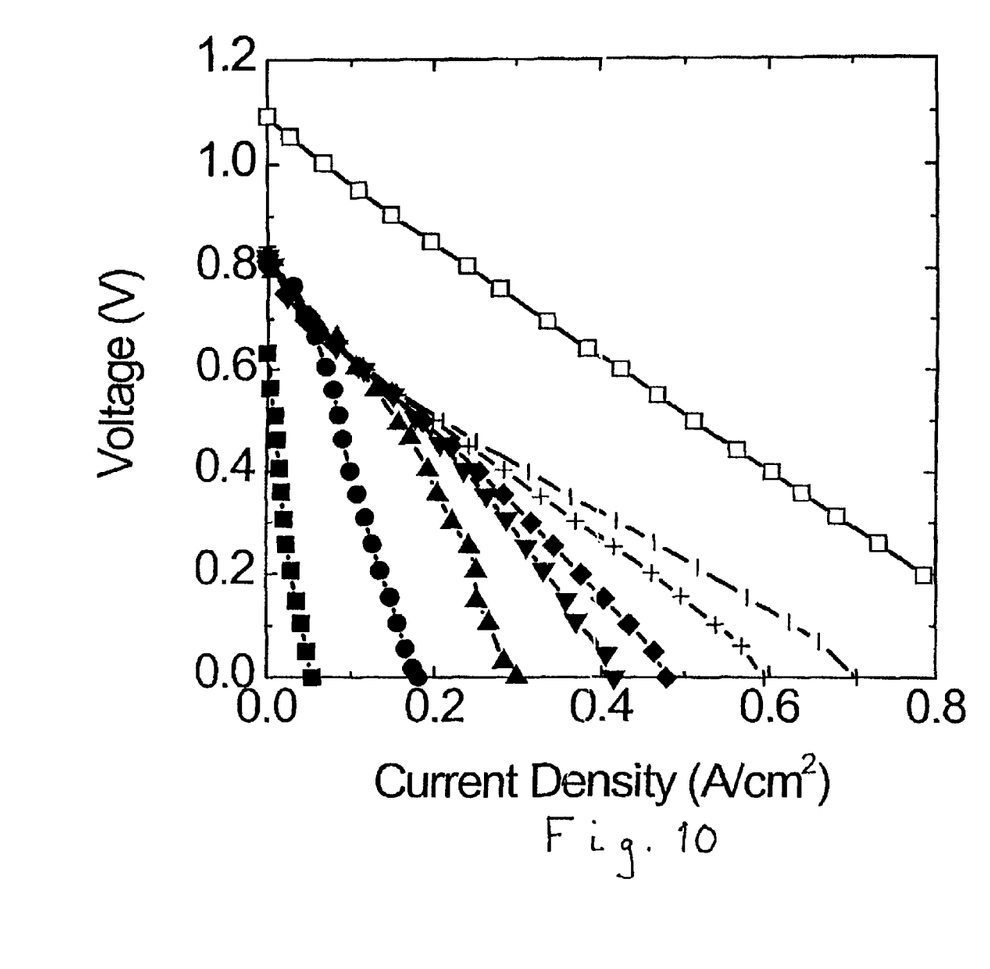
FIG. 10 is a diagram showing the effect of fuel concentration using toluene as the fuel and varying the flow rate of $N_2$ to change the toluene concentration.

We first examined the effect of fuel concentration using dry toluene as the fuel, varying the flow rate of N$_2$ to change the toluene concentration, obtaining the V-I curves shown in FIG. 10. First, even for high concentrations of toluene, the open-circuit voltage (OCV) was only slightly above 0.8 V, well below the equilibrium value of 1.14 V predicted by the Nernst Equation. Since the OCV for H$_2$ was 1.05 V, in good agreement with the Nernst value, it appears that the low OCV for toluene is due to kinetic limitations. As suggested in the case of n-butane, it seems likely that the oxidation of toluene occurs through a complex set of surface reactions and that equilibrium is established between unknown reaction intermediates. Second, the maximum current density increased with concentration. Theoretical modeling has indicated that diffusion of the fuel to the electrolyte interface can lead to V-I curves like those shown in FIG. 10. Indeed, a simple calculation of the diffusive flux of toluene through the porous anode, assuming the concentration of toluene is zero at the electrolyte interface, correctly predicts the magnitude of the maximum current for a concentration of 5% toluene. At higher fuel concentrations, the current density is probably controlled by oxidation kinetics at the electrolyte interface and ion conductivity in the electrolyte. When 1% toluene was fed to the anode, even the OCV is affected.

Figure 11:
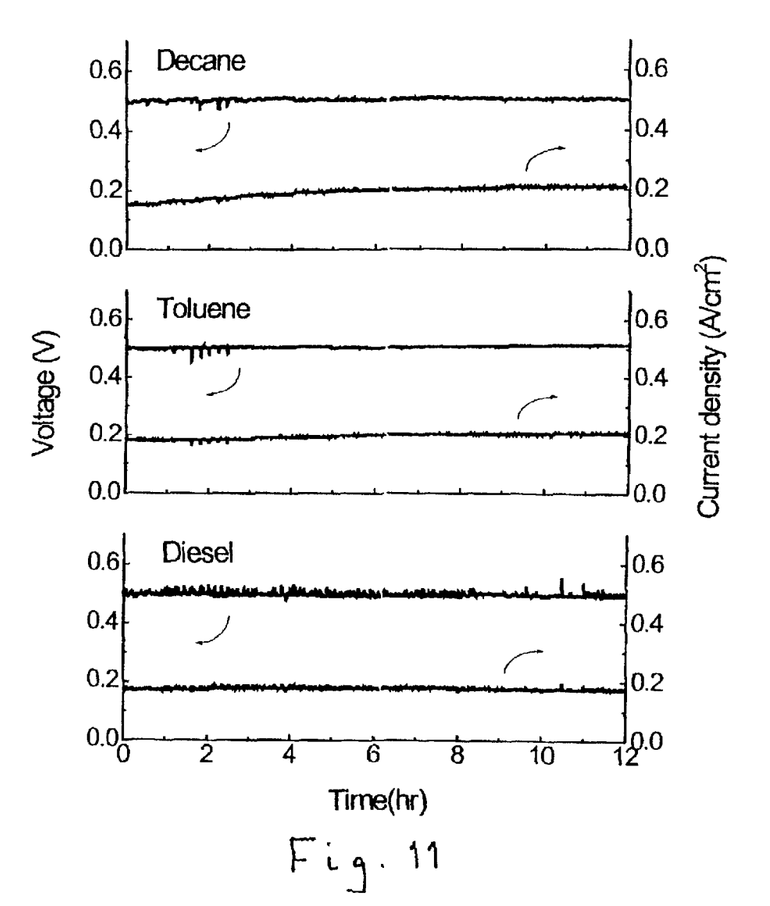
FIG. 11 is a diagram showing the results of operation of a solid oxide fuel cell in accordance with the method of this invention for n-decane, toluene, and a synthetic diesel fuel.

The data in FIG. 10 would not be significant unless the cell performance were stable. The stability of this cell for operation using dry liquid fuels is demonstrated in FIG. 11 for n-decane, toluene, and a synthetic diesel at 973° K and a fuel concentration of 40 wt % hydrocarbon in N$_2$. In these measurements, the cell potential was maintained at approximately 0.5 volts and the current was measured as a function of time for 12 hrs. For n-decane, we observed a gradual increase in the current density with time, possibly due to conditioning of the catalytic components of the anode. After approximately 4 hrs, the performance remained steady with a power output of 0.1 W/cm$^2$. The data for toluene is essentially indistinguishable from that of n-decane, showing the same steady-state power density. Finally, the steady-state performance of the cell was again similar using a synthetic diesel fuel, SD-2, obtained from Syntroleum Corp. This fuel was produced by a Fischer-Tropsch process and is largely aliphatic and sulfur-free, with a cetane number greater than 74.

Figure 12:
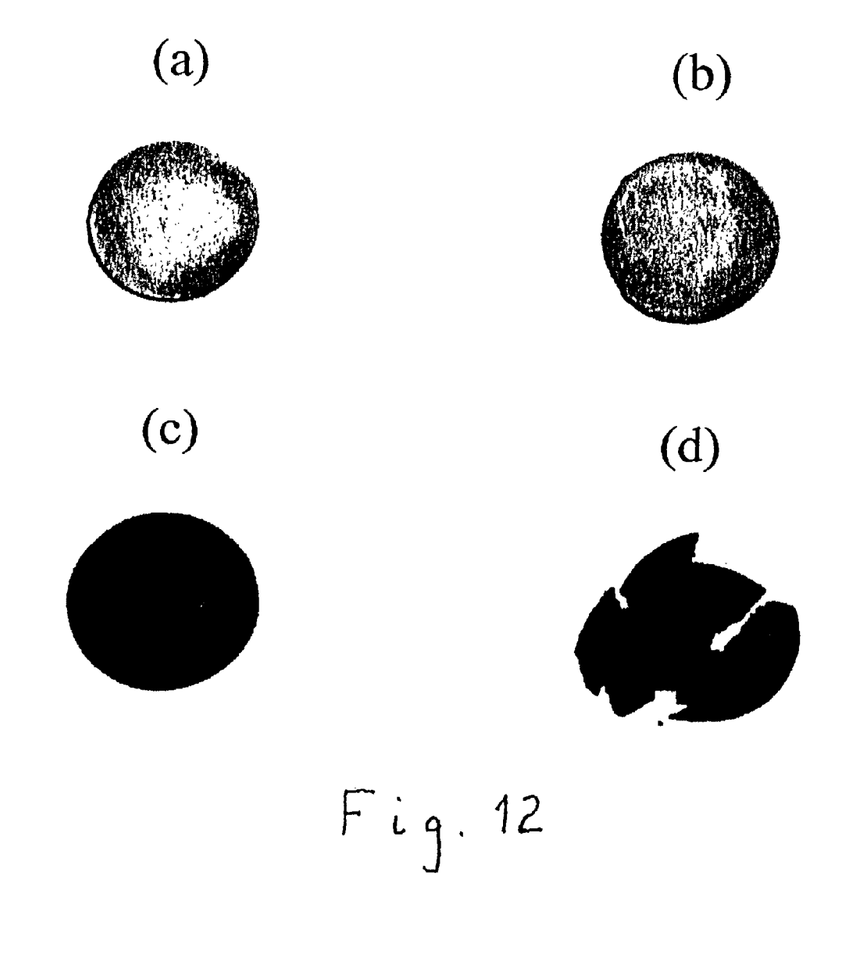
FIG. 12 are photographs showing the results of exposing a Cu-YSZ cermet and a Ni-YSZ cermet to 20% toluene in $N_2$ at 973° K for 1.5 hr.

While N$_2$ was included in these studies to ensure flow in the anode compartment, we also operated the cell on the pure diesel fuel. The performance was similar to that shown in FIG. 11; however, we observed a slow decline in the power density that became noticeable after 2 hrs. Flowing dry N$_2$ through the anode compartment for 1 hr at 973° K restored the power density to its initial value. It appears that the reversible deactivation is due to tar formation in the pores of the anode. Visual inspection of the tube walls on the anode side showed tar formation under these conditions, but it was also observed that this tar could be removed by flowing dry N$_2$ through the tube at 973° K To examine deactivation more closely, we exposed a Cu-YSZ cermet and a Ni-YSZ cermet to 20% toluene in N$_2$ at 973° K for 1.0 hr, with the results shown in the photographs of FIG. 12. Both cermets were prepared in the same manner as the model fuel cells except that no LSM was applied. After toluene exposure, the Ni-YSZ cermet had shattered and the Ni had obviously formed a carbide. By contrast, the Cu cermet remained metallic.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. In a solid oxide fuel cell comprising an anode electrode, a cathode electrode and an electrolyte disposed between said anode electrode and said cathode electrode, a method for generating electricity comprising the steps of:
   contacting said anode electrode with a dry fluid fuel selected from the group consisting of hydrocarbons, carbonaceous materials and mixtures thereof;
   contacting said cathode electrode with an oxidant; and
   directly oxidizing said dry fluid fuel in said solid oxide fuel cell, resulting in generation of electricity.

2. A method in accordance with claim 1, wherein said oxidation is carried out at a voltage potential in a range of about 0 to about 1.1 volts.

3. A method in accordance with claim 1, wherein said anode electrode comprises a porous YSZ layer and one of a metal and a metal alloy comprising an electron-conducting metal having an oxide form that melts at a temperature less than about 1550° C.

4. A method in accordance with claim 3, wherein said electron-conducting metal is selected from the group consisting of Cu, Ni and alloys thereof.

5. A method in accordance with claim 3, wherein said anode electrode further comprises ceria.

6. A method in accordance with claim 5, wherein said ceria comprises in a range of about 5% to about 40% by weight of said porous YSZ layer.

7. A method in accordance with claim 3, wherein said electron-conducting metal comprises at least about 10% by weight of said porous YSZ layer.

8. A method in accordance with claim 1, wherein said dry fluid fuel comprises at least two carbon atoms.

9. A method in accordance with claim 8, wherein said dry fluid fuel comprises in a range of 2 to 20 carbon atoms.

10. A method in accordance with claim 1, wherein said dry fluid fuel is selected from the group consisting of methane, alcohols, toluene, n-decane, synthetic diesel fuels and mixtures thereof.

11. A method for direct oxidation of dry fluid fuel comprising the steps of:
    introducing said dry fluid fuel directly into an anode side of a solid oxide fuel cell comprising an anode electrode comprising a porous YSZ layer and one of a metal and a metal alloy comprising an electron-conducting metal having an oxide form which melts at a temperature of less than about 1550° C., a cathode electrode and an electrolyte disposed between said anode electrode and said cathode electrode;
    introducing an oxidant into a cathode side of said solid oxide fuel cell; and
    electrochemically reacting said dry fluid fuel and said oxidant, whereby said dry fluid fuel is oxidized to produce electrical energy.

12. A method in accordance with claim 11, wherein said dry fluid fuel comprises at least two carbons.

13. A method in accordance with claim 12, wherein said dry fluid fuel comprises in a range of about 2 to about 20 carbons.

14. A method in accordance with claim 11, wherein said dry fluid fuel is selected from the group consisting of methane, alcohols, toluene, n-decane, synthetic diesel fuels and mixtures thereof.

15. A method in accordance with claim 11, wherein said electron-conducting metal is selected from the group consisting of Cu, Ni and alloys thereof.

16. A method in accordance with claim 11, wherein said anode electrode further comprises ceria.

* * * * *